United States Patent [19]

Pyzik et al.

[11] Patent Number: 5,145,504
[45] Date of Patent: Sep. 8, 1992

[54] BORON CARBIDE-COPPER CERMETS AND METHOD FOR MAKING SAME

[75] Inventors: Aleksander J. Pyzik, Midland; Robert T. Nilsson, Cedar, both of Mich.

[73] Assignee: The Dow Chemical Company, Midland, Mich.

[21] Appl. No.: 726,448

[22] Filed: Jul. 8, 1991

[51] Int. Cl.$^5$ .............. C22C 29/00; C22C 29/02; C22C 29/14; C22C 5/00
[52] U.S. Cl. .............................. 75/230; 75/236; 75/244; 75/247
[58] Field of Search .............. 75/245, 230, 238, 244, 75/247, 236

[56] References Cited

U.S. PATENT DOCUMENTS

| | | | |
|---|---|---|---|
| Re. 32,942 | 6/1989 | Butt | 75/235 |
| 2,791,025 | 5/1957 | Ballhausen et al. | 419/12 |
| 3,829,295 | 8/1974 | Farmer et al. | 419/12 |
| 4,227,928 | 10/1980 | Wang | 75/238 |
| 4,946,643 | 8/1990 | Dunmead et al. | 419/12 |
| 4,954,170 | 9/1990 | Frey et al. | 75/229 |
| 4,961,778 | 10/1990 | Pyzik et al. | 75/230 |
| 5,004,498 | 4/1991 | Shimamura et al. | 75/233 |
| 5,006,493 | 4/1991 | Schuetz | 501/127 |
| 5,007,476 | 4/1991 | Newkirk et al. | 164/97 |
| 5,021,368 | 6/1991 | Hoffman et al. | 501/92 |

OTHER PUBLICATIONS

Smugersky, et al., "Development of B4C/Cu Cermets", Sandia laboratories 78-2317, TTC/0017 (1978).
Keil, et al., "A Feasibility Study for Fabrication of Cu-B4C Sheet", LA-3570-MS, Los Alamos Scientific Laboratories, Los Alamos (1965).

*Primary Examiner*—Brooks H. Hunt
*Assistant Examiner*—Daniel J. Jenkins

[57] ABSTRACT

Ceramic metal compositions are described that include a ceramic phase content of at least 60 percent by volume of said composition and a copper metal phase permeating the ceramic phase. The resulting composition is substantially fully densified, having a connected or isolated ceramic grain structure, preferably of fine $B_4C$ grains of less than 3 micrometers. Flexure strength and fracture toughness for 80 volume percent $B_4C$-20 volume percent Cu cermets are 6.62 MPa·m$^{\frac{1}{2}}$ and 725 MPa, respectively. The process of the invention includes as a key element, contacting a porous article of ceramic phase with copper metal followed by heating to above melting and subjecting said article to pressure of at least 200 MPa, such that the porous body is filled with metal and the composition is substantially fully densified.

10 Claims, No Drawings

BORON CARBIDE-COPPER CERMETS AND METHOD FOR MAKING SAME

BACKGROUND OF THE INVENTION

The invention relates to ceramic-metal compositions or cermets, especially of boron carbide and copper. More particularly the invention relates to densified cermets of $B_4C$ and Cu that have selected desirable characteristics that are derived from having a predominate ceramic component.

The potential of ceramic-metal compositions that include a unique combination of properties, such as the hardness of a ceramic material combined with the ductility of a metal, has long been of interest. It has, however, proved difficult to achieve cermet compositions of many desirable materials that are fully densified and have a particularly desired range of properties. The difficulties arise form the conflicting physical and chemical nature of the starting materials.

Major areas of difficulties in processing of ceramic-metal composites are associated with:

(i) chemical reactions of the starting materials such as oxidation and/or other reactions leading to metal depletion and formation of undesirable phases between ceramic and metal; and (ii) non-wetting behavior of the metal with respect to the ceramic component.

These difficulties lead to cermet products that have a higher porosity than desired and lack desired ceramic-metal phases that would, if present, impart needed properties to the cermet.

Where the metal chosen for the cermet composition is, for example, non-reactive and non-wetting, such as copper in a boron carbide ceramic phase, there is serious difficulty in achieving a fully dense cermet that is high in ceramic content. The difficulties in manufacturing $B_4C/Cu$ cermets are associated with the non-wetting characteristics of Cu for $B_4C$. If, in making a $B_4C/Cu$ cermet, the reaction mixture is heated above the Cu metal melting temperature, a conventional processing step in densifying composite compositions, Cu forms spheres that separate from the mixture of ceramic and metal particles. In addition, where a high ceramic content is desired and the particle size of the ceramic is reduced toward that object, the finer the ceramic particles and the greater the ceramic content of the mixture, the more metal migrates out of the bulk mixture towards the surface of a porous compact of the ceramic. Obtaining high ceramic content cermets of high density of materials such as boron carbide and copper has heretofore proved substantially impossible. Heating to even high temperatures does not improve densification because the wetting of $B_4C$ by Cu is not a function of temperature, in contrast to an aluminum-boron carbide system, for example, wherein the metal wets the ceramic and can, thus, infiltrate into a porous ceramic compact system. When the non-wetting metal melts, the system tends to separate and becomes uncontrollable with respect to densification.

Therefore, all prior work with the $B_4C/Cu$ system has been conducted below the melting temperature of Cu in order to densify cermets. Below the metal melting point, a metal component must be physically deformed and forced into the small channels between the ceramic grains of a ceramic body. The smaller the ceramic grains, the smaller are the channels between the grains and, as a result, the more difficult it is to sufficiently deform the metal to achieve a dense cermet structure. As a consequence, the maximum amount of ceramic and minimum particle size that can be employed in making $B_4C$-Cu cermets has, heretofore, been limited. Keil, et al., in "A Feasibility Study for Fabrication of Cu-$B_4C$ Sheet", LA-3570-MS, Los Alamos Scientific Laboratories, Los Alamos (1965), describes producing 2.5 mm thick sheets of 50 volume percent $B_4C/Cu$ by means of a process combining vacuum hot pressing and hot rolling.

Smugersky, et al., in "Development of $B_4C/Cu$ Cermets", Sandia Laboratories 78-2317, TTC/0017 (1978) utilizes a hot isostatic pressing technique to make $B_4C/Cu$ cermets, pressing at 103 MPa and 500° C., for three hours. Smugersky's experiments indicated that full density could be obtained only if the total $B_4C$ ceramic component content is below 60 volume percent. Densities of 97.5 percent and 88.2 percent are obtained with $B_4C$ contents of 70 and 80 volume percent, respectfully, but at greatly reduced strength. In these experiments a coarse $B_4C$ powder, greater than 44 micrometers average particle size, was required and attempts to use finer $B_4C$ powder led to cermets of high porosity. The bending strength produced in the Sandia experiments, in terms of transverse rupture strength, were 40 and 56 percent lower, for the 70 and 80 volume percent material, respectively, than the 87 MPa achieved for the 60 percent cermet. According to the work done in Sandia, the maximum content of $B_4C$ in $B_4C/Cu$ cermets has been limited to less than about 60 volume percent with a minimum $B_4C$ grain size of about 44 micrometers.

For ceramic-metal systems that are non-reactive and/or non-wetting, such as boron carbide and copper, it would be desirable to produce ceramic-metal compositions having a greater than 60 volume percent ceramic content, in order to provide densified cermet compositions that include ceramic characteristics that are advantageous for many uses, as well as the characteristics of the metal. What is needed are cermet compositions having a greater flexibility in composition, preferably including an increased ceramic content, such that a desirable quality of an individual ceramic component may be emphasized.

SUMMARY OF THE INVENTION

The invention is a densified ceramic-metal composition or cermet that comprises a ceramic phase comprising at least 60 percent by volume of said composition and a copper metal phase permeating said ceramic phase, wherein said composition is substantially fully densified and said copper metal is non-reactive and non-wetting of said ceramic phase. Preferably, the ceramic phase comprises about 70 to 90 volume percent of said composition.

The composition of the invention includes ceramic phases of $B_4C$, SiC, C, or ZrC. The ceramic phase is preferably $B_4C$ in a particulate form of any size, but preferably having a particle size of less than about 44 micrometers.

The ceramic phase is preferably in the form of a porous body or article prior to permeating and densifying with said copper metal. An unfired porous greenware is employed wherein it is desired that the ceramic phase after densifying with copper, comprises isolated structures surrounded by continuous metal. A sintered porous article is formed if it is desired that the ceramic phase after densifying with copper article comprises continuous ceramic structures or skeleton surrounding said metal.

Where the composition is a ceramic phase of $B_4C$ of 70 to 90 volume percent of said composition and a metal phase, comprising principally Cu, densified to substantially 100 percent of theoretical density, the composition will have a flexure strength of about 350 MPa to about 725 MPa and fracture toughness greater than about 4.5 MPa·m$^{\frac{1}{2}}$.

The invention also includes a process for making a densified ceramic-metal composition. The process comprises:

forming a porous body from a particulate ceramic powder comprising at least about 60 percent by volume of said composition;

contacting said porous body with a metal comprising copper;

heating said ceramic and metal to a temperature that liquefies said metal but is below the temperature at which said metal wets said ceramic; and applying pressure to said liquefied metal such that said metal is forced into and substantially completely fills the pores of said porous body and said ceramic-metal composition is fully densified.

An advantage of the application of external force to the liquifying metal is that lower temperatures are required to densify the compositions of the invention. Preferably pressures in excess of 200 MPa are employed.

DETAILED DESCRIPTION OF THE INVENTION

The ceramic-metal or cermet composition of the invention includes a copper metal component or phase and a high ceramic component or phase content such that the cermet is characterized by high hardness with respect to cermets of the prior art, while maintaining desirable fracture toughness and flexural strength. The particular advantages achieved for a given ceramic-metal system depend upon the characteristics of the individual components selected.

The ceramic component or phase is any of the well known ceramic materials having high hardness, such as, for example, $B_4C$, SiC or ZrC. A particular ceramic component is selected to impart a desired quality of the overall cermet composition. The preferred ceramic component of the composition of the invention is $B_4C$ which is characterized by high hardness and superior wear resistance.

The copper metal component of the composition of the invention is selected, in general, to impart toughness or ductility to the ceramic material, as well as thermal and electrical conductivity. The particular copper metal alloy component selected is non-reactive with the ceramic phase, such as $B_4C$, where, for example, high electrical conductivity of the densified product is of interest. For such a product quality, a desired characteristic of the densified cermet is that there is no change in chemical composition during periods of prolonged heating after densification. Other non-reactive systems similar to $B_4C$-Cu are SiC-Cu or ZrC-Cu.

The invention provides a process for producing the above-described cermets of the invention that are characterized by high ceramic phase content. The process first requires forming a porous compact, preform or greenware article from a ceramic particulate. In general, a fine ceramic powder, preferably having a particle diameter size range of about 0.1 to 10 micrometers is utilized. As is conventional, the particulate material is dry mixed or dispersed in a liquid followed by consolidation to form the porous green body. Where the system will include metal and ceramic components that are reactive and/or it is desired that the densified composite comprises a substantially continuous ceramic structure or skeleton surrounding metal islets, it is desirable to next sinter the porous greenware. Preferably, the greenware is sintered to achieve a ceramic content above 70 volume percent. Where the ceramic is $B_4C$, the greenware is sintered at about 2000° C. or higher to form porous compacts or preforms having densities ranging from greater than 70 to 90 percent of theoretical density.

The process then requires that the greenware or sintered porous preform or article be placed in contact with the selected copper metal component of the cermet and heated to at least the liquification temperature of the metal. Heating may take placed in a vacuum or under an inert gas. The metal placed in contact with the porous body prior to liquification may be in the form of a particulate or solid bars or chips or any other suitable form.

Pressure is then applied to the liquid metal such that the metal is pushed into the porous body structure of the greenware or porous compact. Generally, any pressure technique that exerts at least about 200 MPa on the metal is suitable.

For the $B_4C$-Cu cermet system, flexure strengths exceeding 2-5 times those of the best previously made $B_4C$/Cu cermets have unexpectedly been achieved.

The following examples further define, but are not intended to limit, the scope of the invention.

EXAMPLE 1

$B_4C$ (ESK specification 1500 manufactured by Elektroschemeltzwerk Kempten of Munich, Germany and having an average particulate size of 3 micrometers) powder is dispersed in water at pH 7.0. The suspension is cast on a plaster of Paris mold to form a porous ceramic body having a density of 63 volume percent of theoretical (100%) density. The $B_4C$ greenware is dried for 24 hours at 105° C. and then sintered at 2250° C. for 30 minutes in a graphite element furnace to a density of 87 percent of theoretical.

Next, copper is placed on the top of the $B_4C$ preform and the system is placed in a graphite can and heated. When the temperature of the assembly approached 1100° C., a pressure of 830 MPa is applied forcing the Cu metal into the porous $B_4C$ body. The resulting $B_4C$/Cu cermet is characterized by a density that is 100 percent of the theoretical (3.8 gg/cc), a hardness of 1556 kg/mm$^2$, a flexure strength of 352 MPa and fracture toughness of 6.62 MPa·m$^{\frac{1}{2}}$. In comparison, a flexure strength of 40 MPa was reported by Smugersky, et al., cited above for the similar composition.

EXAMPLE 2

$B_4C$ powder is dispersed and formed into a greenware compact preform as described in Example 1. The greenware $B_4C$ preform, containing about 79 volume percent of $B_4C$, is filled with metal in the manner described in Example 1. The resulting $B_4C$/Cu cermet is characterized by full density, a hardness of 1500 kg/mm$^2$ and a flexure strength of 725 MPa. The cermet has a fracture toughness of 4.53 MPa·m$^{\frac{1}{2}}$, in comparison with a fracture toughness of $B_4C$ of about 3 MPa·m$^{\frac{1}{2}}$.

The microstructure of the cermet is characterized by Cu forming a continuous metal phase distributed uniformly throughout the cermet.

EXAMPLE 3

A sintered preform of $B_4C$ is made as described in Example 1 such that the preform is 70 volume percent $B_4C$. The preform is then infiltrated with Cu by the application of pressure, also as described in Example 1. The resulting $B_4C$/Cu cermet is fully densified and characterized by a flexure strength of 503 MPa, a fracture toughness of 7.25 MPa·m$^{\frac{1}{2}}$ and a hardness of 1525 kg/mm$^2$.

EXAMPLE 4

A ceramic-metal composite of 80 volume percent $B_4C$ and 20 volume percent Cu is made in accord with Example 1. The fully densified cermet is characterized by a fracture toughness of 6.62 MPa·m$^{\frac{1}{2}}$ and a flexure strength of 425 MPa.

What is claimed is:

1. A densified ceramic-metal composition, comprising:
   a ceramic phase comprising at least 60 percent by volume of said composition; and
   a copper metal phase permeating said ceramic phase, wherein said composition is substantially fully densified and said copper metal is non-reactive and non-wetting of said ceramic phase.

2. The composition of claim 1 wherein said ceramic phase is $B_4C$, SiC or ZrC.

3. The composition of claim 1 wherein said boron carbide ceramic phase grain size after densification is 3 micrometers or less.

4. The composition of claim 1 wherein said ceramic phase is about 70 to about 90 percent by volume of said composition.

5. The composition of claim 4 wherein said ceramic phase is $B_4C$ in a particulate form having a particle size of less than about 44 micrometers.

6. The composition of claim 2 wherein said ceramic phase is a porous body prior to permeating and densifying with said copper metal.

7. The composition of claim 6 wherein said ceramic phase porous body is in the form of an unfired porous green-ware article, wherein after densifying with copper, said article comprises substantially isolated ceramic structures surrounded by substantially continuous metal.

8. The composition of claim 6 wherein said ceramic phase porous body is in the form of a sintered porous article, wherein after densifying with copper said article comprises substantially continuous ceramic structures surrounding said metal.

9. A densified ceramic-metal composition, comprising:
   a ceramic phase of $B_4C$ wherein said ceramic is 70 to 90 volume percent of said composition; and
   a metal phase, comprising principally Cu, wherein said composition is substantially 100 percent of theoretical density.

10. The composition of claim 9 having a flexure strength of about 350 MPa to about 725 MPa and fracture toughness greater than about 4.5 MPa·m$^{\frac{1}{2}}$.

* * * * *